(12) United States Patent
Miyazawa et al.

(10) Patent No.: US 8,345,139 B2
(45) Date of Patent: Jan. 1, 2013

(54) EYEPIECE LENS FOR VIEWFINDER

(75) Inventors: Nobuyuki Miyazawa, Utsunomiya (JP);
Yasuaki Hagiwara, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 105 days.

(21) Appl. No.: 13/078,489

(22) Filed: Apr. 1, 2011

(65) Prior Publication Data
US 2011/0242397 A1 Oct. 6, 2011

(30) Foreign Application Priority Data
Apr. 5, 2010 (JP) ................................. 2010-087086

(51) Int. Cl.
*H04N 5/222* (2006.01)
*H04N 5/225* (2006.01)
*G03B 13/10* (2006.01)
*G02B 25/00* (2006.01)

(52) U.S. Cl. ................... 348/333.01; 348/345; 396/378; 359/644

(58) Field of Classification Search ............. 348/333.01, 348/345; 359/644, 683; 396/378–379
See application file for complete search history.

(56) References Cited

U.S. PATENT DOCUMENTS

| 5,749,008 | A | 5/1998 | Ishihara et al. | |
| 6,667,836 | B2 * | 12/2003 | Neil | 359/643 |
| 7,133,210 | B2 * | 11/2006 | Mitsuki et al. | 359/643 |
| 7,605,983 | B2 * | 10/2009 | Yokoyama | 359/645 |
| 7,962,035 | B2 * | 6/2011 | Arai | 396/373 |
| 7,969,658 | B2 * | 6/2011 | Nishio et al. | 359/645 |

FOREIGN PATENT DOCUMENTS

| JP | 2003-161915 A | 6/2003 |
| JP | 2007-264179 A | 10/2007 |

* cited by examiner

*Primary Examiner* — Aung S Moe
*Assistant Examiner* — Mekonnen Dagnew
(74) *Attorney, Agent, or Firm* — Canon U.S.A., Inc. IP Division

(57) ABSTRACT

An eyepiece lens includes, in order from an image display surface side to an observer side, a positive first lens, a negative second lens, and a positive third lens. A surface on the image display surface side of the positive first lens has a refractive power stronger than a refractive power of an opposite surface thereof. The negative second lens has a meniscus shape, and a surface on the image display surface side of the negative second lens has a convex shape. Both surfaces of the positive third lens have a convex shape. In the eyepiece lens, during diopter adjustment, the first through the third lenses move along an optical axis. A focal length (f) of the entire eyepiece lens and a diagonal length (H) of the image display surface satisfy the following conditions:

$0.45 < H/f < 0.70$, and $21.0 \text{ (mm)} < f < 29.0 \text{ (mm)}$.

5 Claims, 7 Drawing Sheets

EYEPIECE LENS FOR VIEWFINDER

BACKGROUND OF THE INVENTION

1. Field of the Invention

The present invention relates to a viewfinder optical system and an optical apparatus that uses the viewfinder optical system. More specifically, the present invention relates to an eyepiece lens for a viewfinder used in a video camera, a still camera, or a broadcast camera.

2. Description of the Related Art

Conventionally, an electronic viewfinder used in a camera uses an eyepiece lens for allowing an observer to observe through the viewfinder a magnified image of an image displayed on a cathode ray tube (CRT) screen or a liquid crystal display (LCD) screen provided within the camera. Because an electronic viewfinder is required to have a function for allowing the observer to observe a magnified large image, it is necessary for an electronic viewfinder to use a large image display surface, such as a CRT screen or an LCD screen. Otherwise, it is required to increase the magnification of the eyepiece lens.

However, if a large image display surface is used, a large-size viewfinder may become necessary. Accordingly, in this case, it is useful to increase the magnification of the eyepiece lens rather than to increase the size of an image display surface. In order to increase the magnification of an eyepiece lens, it is necessary to steepen the angle of incidence of light incident to the pupil of an observer by intensifying the refractive power of the eyepiece lens. To that end, it has been conventional practice to use a large number of positive lenses.

However, axial chromatic aberration and lateral chromatic aberration cannot be corrected by using only lenses having a positive refractive power. Therefore, it is useful to correct chromatic aberration by using a lens having a negative refractive power.

Accordingly, it is useful, as a configuration of an eyepiece lens that uses a small number of constituent lenses and assigned with a high magnification, to use a minimum number of negative lenses for correcting chromatic aberration, i.e., one negative lens, and two lenses having a positive refractive power, the number of which is more than that of the negative lens by one.

Japanese Patent Application Laid-Open No. 2003-161915 discusses an eyepiece lens whose distance from an image display surface to an observation surface of the eyepiece lens is short and having three lenses including, in order from the image display surface side, a lens having a positive refractive power, a lens having a negative refractive power, and a lens having a positive refractive power. Japanese Patent Application Laid-Open No. 2007-264179 discusses an eyepiece lens having the same lens configuration as that of the eyepiece lens discussed in Japanese Patent Application Laid-Open No. 2003-161915. However, the eyepiece lens discussed in Japanese Patent Application Laid-Open No. 2007-264179 has a short principal point distance. Accordingly, the eyepiece lens discussed in Japanese Patent Application Laid-Open No. 2007-264179 has a short distance from the image display surface to an eye point.

With respect to an eyepiece lens, because the diameter of the pupil of the observer is fixed, if the magnification of the optical system is increased on a proportional basis, the image is not necessarily proportionally magnified contrary to the case of using a photographic lens. For example, coma occurring on an eyepiece lens may become more recognizable as coma after passing through the diameter of the pupil of the observer as the diameter of the eyepiece lens becomes smaller. Accordingly, the smaller the size of an eyepiece lens is, the more accurately it is required to correct coma.

The eyepiece lens discussed in Japanese Patent Application Laid-Open No. 2003-161915 is a small-size eyepiece lens having a focal length of less than 20 mm and includes three constituent lenses provided very close to one another. Accordingly, in order to achieve a sufficiently high magnification, it becomes difficult to correct coma in the above-described conventional eyepiece lens.

In addition, an eyepiece lens is required to include a function for adjusting a diopter corresponding to the eyesight of an observer. However, in the eyepiece lens discussed in Japanese Patent Application Laid-Open No. 2007-264179, the principal point position exists at a position close to the eyepiece lens side due to a wide distance between the three constituent lenses and due to a strong negative refractive power of the negative lens on the image display surface side. Accordingly, the distance from the image display surface to the lens provided closest to the image display surface is short.

As a result, in adjusting a diopter by the entire eyepiece lens, the range of adjustment of the diopter may become narrow in the direction of the negative-sign diopter.

SUMMARY OF THE INVENTION

The present invention is directed to an eyepiece lens of a size as small as possible and capable of allowing an observer to observe a high-quality large-size image.

According to an aspect of the present invention, an eyepiece lens includes, arranged along an optical axis and in order from an image display surface side to an observer side: a positive first lens in which a surface on the image display surface side has a refractive power stronger than a refractive power of a surface on the observer side; a negative second lens having a meniscus shape, a surface of the negative second lens on the image display surface side has a convex shape; and a positive third lens, both surfaces of which have a convex shape. In the eyepiece lens, during diopter adjustment, the first through the third lenses move along the optical axis. A focal length (f) of the entire eyepiece lens and a diagonal length (H) of the image display surface satisfy the following conditions:

$$0.45 < H/f < 0.70$$

$$21.0 \text{ (mm)} < f < 29.0 \text{ (mm)}.$$

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

DESCRIPTION OF THE EMBODIMENTS

Figure 1:
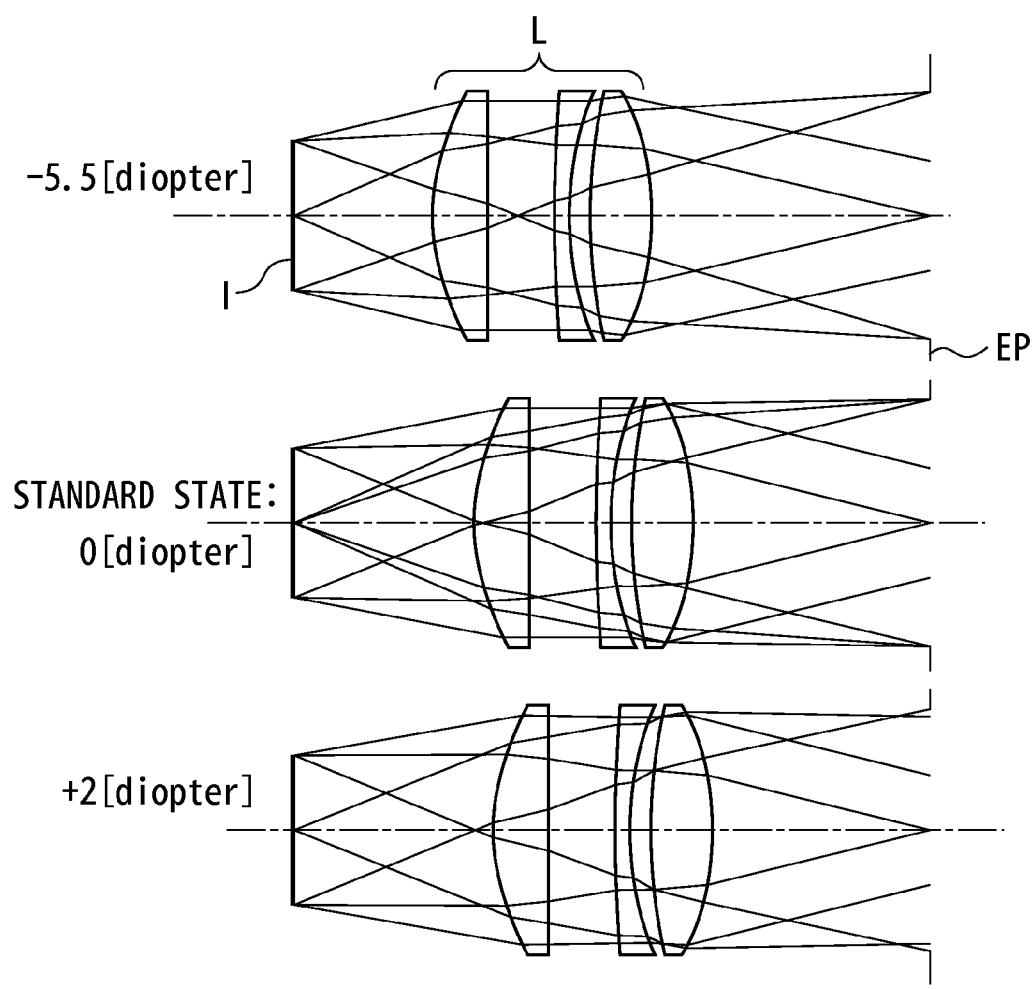
FIG. 1 is a lens cross section of an optical system according to numerical example 1.

Various exemplary embodiments of the present invention will now be described in detail with reference to the drawings. It should be noted that the relative arrangement of the components, the numerical expressions, and numerical values set forth in these embodiments do not limit the scope of the present invention unless it is specifically stated otherwise.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens elements and their materials.

Notice that similar reference numerals and letters refer to similar items in the following figures, and thus once an item is defined in one figure, it may not be discussed in subsequent figures.

Note that herein when referring to correcting or corrections of an error (e.g., aberration), a reduction of the error and/or a correction of the error is intended.

The present invention is directed to an eyepiece lens of a size as small as possible, whose image display surface is small-sized, and capable of allowing an observer to observe a high-quality large-size image. An eyepiece lens according to an exemplary embodiment of the present invention is an eyepiece lens for a viewfinder. However, the present invention is not limited to this. More specifically, an eyepiece lens for other devices or apparatuses can implement the present invention.

An eyepiece lens for a viewfinder (of an image pickup apparatus) according to an exemplary embodiment of the present invention is constituted by three lenses including, in order from the image display surface side (the object side) to the observer side (the viewer/photographer side), a first lens having a positive refractive power, a second lens having a negative refractive power, and a third lens having a positive refractive power. The first, second and third lenses are preferably arranged along an optical axis and are configured to form an image of an image display surface on an image plane (e.g., the retina of the observer).

In the present exemplary embodiment, for the image display surface, an element that electrically displays an image, such as a liquid crystal display (LCD) element, can be used. Alternatively, an object image forming position can be used as the image display surface. Further alternatively, a diffusion plate provided at the object image forming position can be used as the image display surface.

Each of the first through the third lenses is a single lens. The first lens has a strong positive refractive power on the image display surface side. In other words, in the first lens unit, the positive refractive power of the optical surface on the image display surface side is stronger than the positive refractive power of the optical surface on the observer side. This also applies to a case where the optical surface on the observer side has a negative refractive power and the optical surface on the image display surface side has a positive refractive power.

The second lens is a negative lens having a meniscus shape whose surface on the observer side has a concave shape (i.e., convex towards the image display surface side). The third lens is a positive lens, both surfaces of which have a convex shape.

In the viewfinder eyepiece lens according to an exemplary embodiment of the present invention, the surface of the first lens on the image display surface side has a strong positive refractive power. The height of incidence of rays incident on lens surfaces subsequent to the surface of the first lens on the image display surface side (the distance between the vertical position of the incident ray and the optical axis) is set to be low. Accordingly, the viewfinder eyepiece lens according to an exemplary embodiment of the present invention can appropriately reduce the amount of coma that may occur on a surface subsequent to the observer side of the first lens.

Furthermore, the second lens is a negative meniscus lens having a concave surface on the observer side to increase the effect of correcting coma. As described above, each lens is a single lens (i.e., each lens is not a cemented lens). Accordingly, each lens is assigned with a high refractive power. Therefore, the present exemplary embodiment can increase its effect of correcting coma.

The second lens, which is a negative meniscus lens having a concave surface on the observer side, implements an effect of appropriately correcting coma, displacing the principal point of the eyepiece lens towards the image display surface side, and securing a sufficient distance from the image display surface to the first lens required for diopter adjustment. Diopter adjustment can be thought of as a way to adjust the eyepiece lens to match the observer's eyesight. In other words, diopter adjustment serves to focus an image of the image display surface on the image plane (i.e., the retina of the observer).

In addition, the viewfinder eyepiece lens according to the present exemplary embodiment is capable of appropriately correcting coma, regardless of a diopter, by moving the first through the third three lenses integrally (not changing the relative positional relationship) in the direction of the optical axis during diopter adjustment. During diopter adjustment, it is not always required to integrally move the first through the third lenses. In other words, one or two lenses of the three lenses can be moved by a moving amount different from the moving amount of the other lens or lenses. However, during diopter adjustment, it is useful to move all the three lenses.

The eyepiece lens according to the present exemplary embodiment satisfies the following conditions:

$$0.45 < H/f < 0.7 \quad (1)$$

$$21.0 \text{ (mm)} < f < 29.0 \text{ (mm)} \quad (2).$$

where "f" (mm) denotes a focal length of the entire eyepiece lens, "H" (mm) denotes a diagonal length of the image display surface (an image displayed on an image display element for viewfinder or an effective display portion of the image display element).

The condition (1) provides a condition for the ratio of the diagonal length of the image display surface to the focal length of the entire eyepiece lens. If the upper limit value of the condition (1) is exceeded, then it becomes difficult to correct coma. On the other hand, if the lower limit value of the condition (1) is exceeded, then the size of an image to be displayed when observed may be very small.

The condition (2) provides a condition for the focal length of the eyepiece lens. If the upper limit value of the condition (2) is exceeded, then it becomes necessary to increase the dimension of the image display surface to satisfy the condition (1). In this case, the size of the viewfinder may increase. On the other hand, if the lower limit value of the condition (2) is exceeded, then the size of the image display surface may necessarily be reduced to satisfy the condition (1). In addition, in this case, the diameter of the eyepiece lens may necessarily be small. As a result, rays going through the periphery of the eyepiece lens may easily pass within the diameter of the pupil of the observer. Accordingly, coma may become more recognizable.

With the above-described configuration, the present exemplary embodiment can effectively solve the above-described problem.

In addition, the eyepiece lens according to the present exemplary embodiment has an aspheric surface on at least one of the surfaces of the first lens. It is useful if the eyepiece lens according to the present exemplary embodiment satisfies the following condition:

$$1.0 < d12/d23 < 3.3 \qquad (3)$$

where "d12" denotes a distance between the first lens and the second lens and "d23" denotes a distance between the second lens and the third lens.

In the eyepiece lens according to the present exemplary embodiment, the surface of the first lens on the image display surface side has a strong positive refractive power to lower the distance from rays incident to subsequent surfaces to the optical axis. As a result, the eyepiece lens according to the present exemplary embodiment can reduce the amount of coma that may occur on surfaces subsequent to the surface of the first lens on the observer side.

However, unless comma that has occurred on the first lens is sufficiently corrected, the amount of coma may increase due to an error of the relative positions of the first lens and the second lens that may occur during manufacture of the eyepiece lens. Therefore, it is useful if at least one surface of the first lens has an aspheric surface to correct coma within the first lens.

The condition (3) provides a condition for the ratio between the distance between the first lens and the second lens and the distance between the second lens and the third lens. If the upper limit value of the condition (3) is exceeded and the distance between the first lens and the second lens is increased by decreasing the refractive power of the first lens, then the share of power assigned to the second lens and the subsequent lenses to correct coma may increase.

On the other hand, if the distance between the second lens and the third lens is reduced, then the refractive power of the surface of the second lens on the observer side and the refractive power of the surface of the third lens on the image display surface side become close to each other. As a result, the effect of correcting coma may degrade.

On the other hand, if the lower limit value of the condition (3) is exceeded, then the height of incidence of light incident to the second lens becomes high. As a result, it becomes difficult to correct coma within the second lens. In addition, in this case, the principal point position of the eyepiece lens is displaced towards the image display surface side. As a result, the distance from the image display surface side to the first lens may become short. Accordingly, in this case, it becomes difficult to provide a reflection type LCD device. In other words, the type of an available image display device may be adversely limited.

The second and the third lenses may also have an aspheric surface. However, it is preferable that only the first lens has an aspheric surface and the second lens and the third lens are spherical lenses.

In addition, it is useful if the eyepiece lens according to the present exemplary embodiment satisfies the following condition:

$$0.40 < 0.6 \times H/L < 0.70 \qquad (4)$$

where "L" denotes an air-equivalent distance from the image display surface to the first lens when the diopter is 0 diopter (standard state).

The condition (4) provides a condition for the ratio of the diagonal length of the image display surface to the distance from the image display surface to the first lens. If the upper limit value of the condition (4) is exceeded, then it becomes difficult to provide a reflection type LCD device. In other words, the type of an available image display device may be adversely limited.

On the other hand, if the lower limit value of the condition (4) is exceeded, then the total length of the viewfinder may become long. In addition, in this case, the distance from the surface of the third lens on the observer side to the eye point may become short. As a result, it becomes difficult for the observer to observe the image when the observer is wearing glasses.

It is further useful if the ranges of the values in the conditions (1) through (4) are altered as follows:

$$0.48 < H/f < 0.62 \qquad (1a)$$

$$21.5 < f < 27.6 \qquad (2a)$$

$$1.3 < d12/d23 < 3.2 \qquad (3a)$$

$$0.45 < 0.6 \times H/L < 0.55 \qquad (4a).$$

Figure 2:
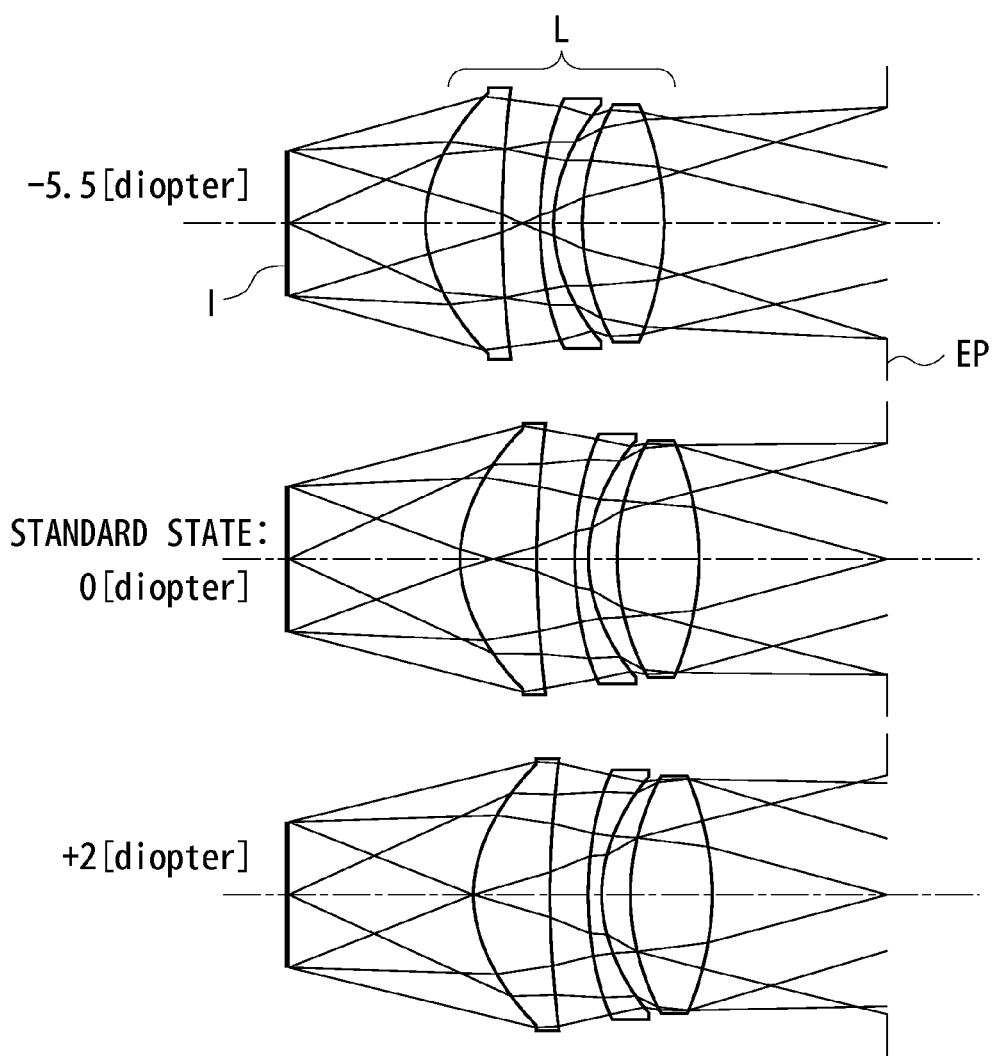
FIG. 2 is a lens cross section of an optical system according to numerical example 2.
Figure 3:
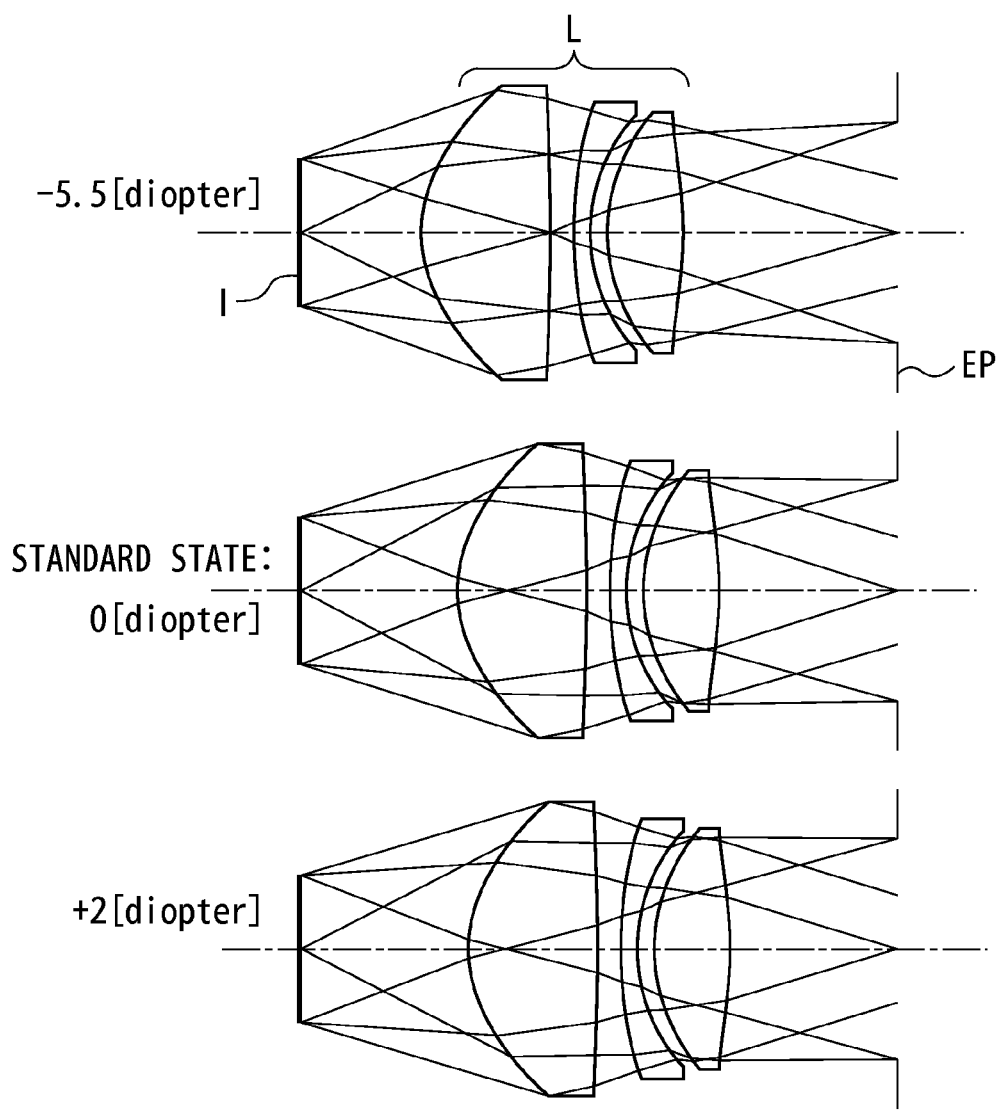
FIG. 3 is a lens cross section of an optical system according to numerical example 3.
Figure 4:
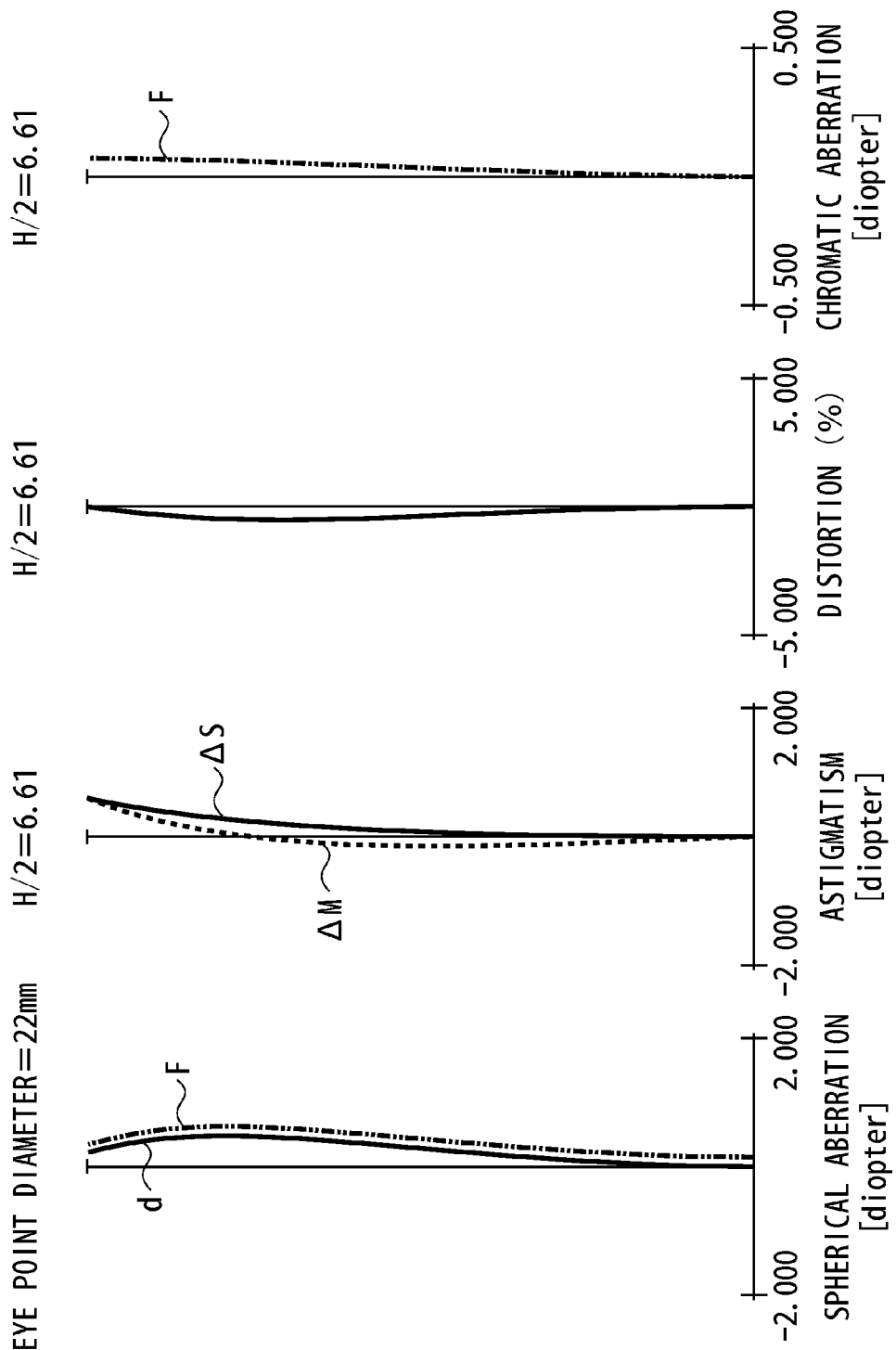
FIG. 4 is an aberration chart of the optical system according to numerical example 1 in a standard state.
Figure 5:
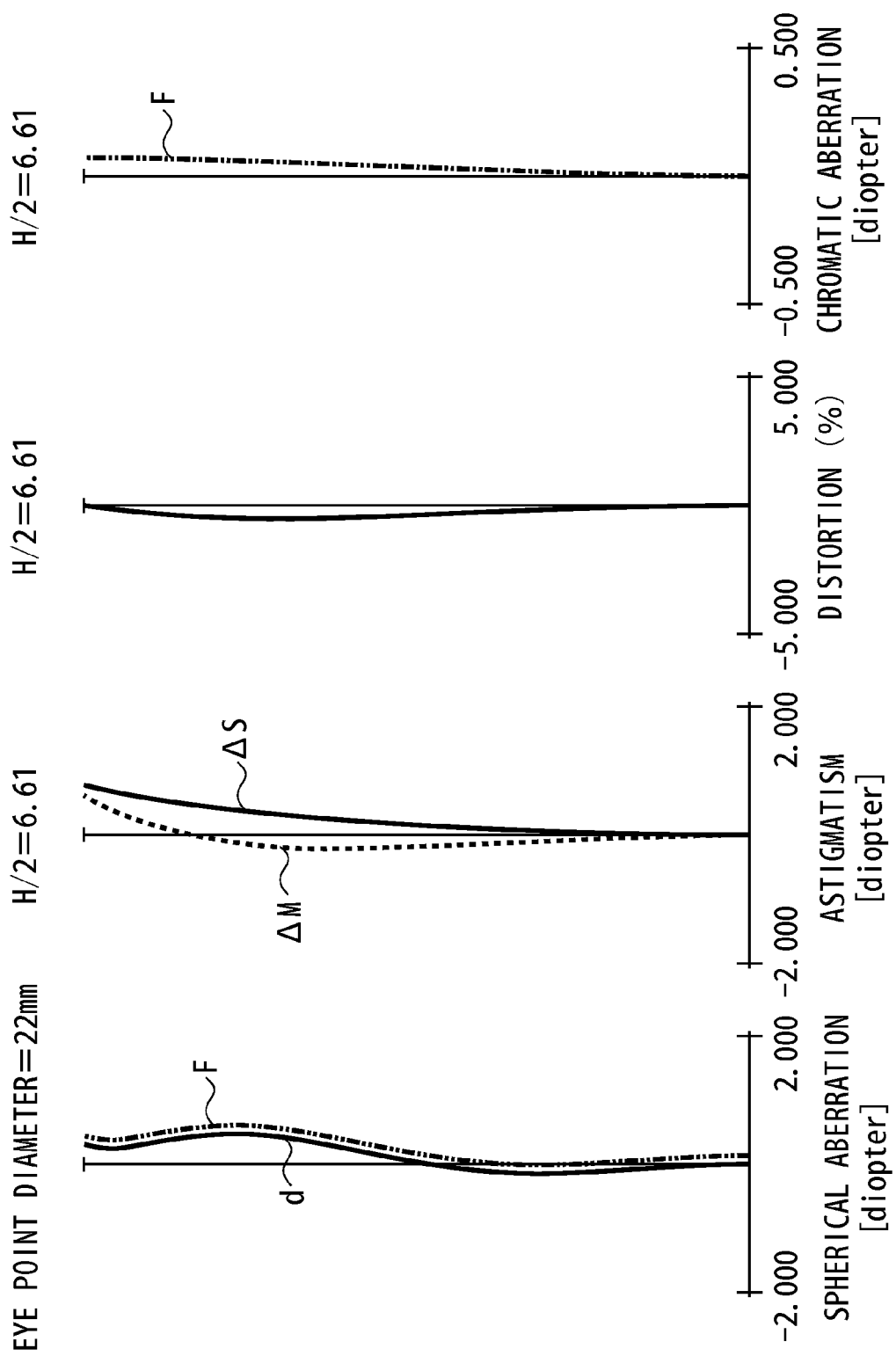
FIG. 5 is an aberration chart of the optical system according to numerical example 2 in the standard state.
Figure 6:
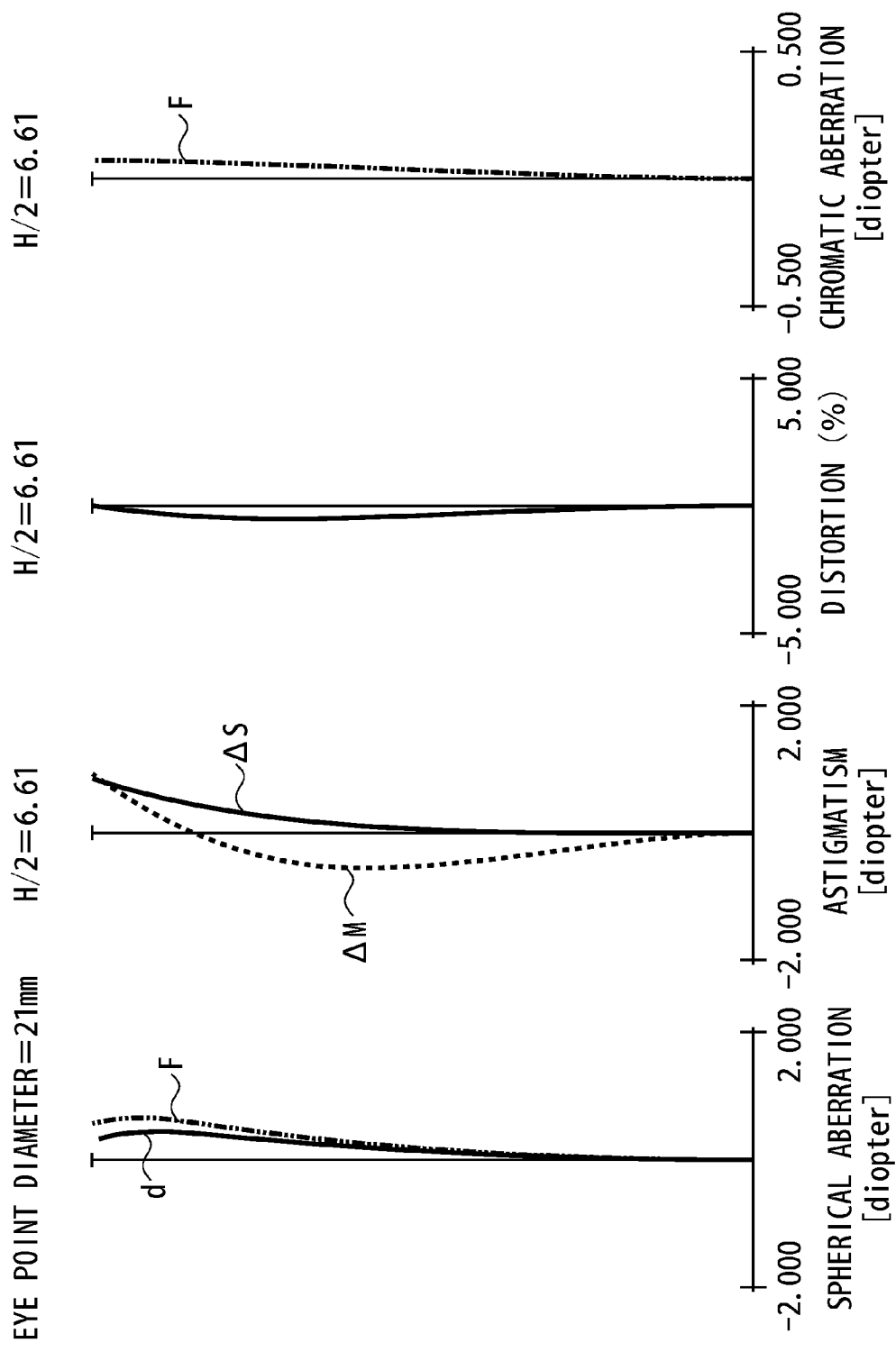
FIG. 6 is an aberration chart of the optical system according to numerical example 3 in the standard state.

FIGS. 1 through 3 are lens cross sections of the numerical examples 1 through 3 described below. FIGS. 4 through 6 are aberration charts of numerical examples 1 through 3 in a standard state (0 diopter). In each aberration chart, "d" and "F" respectively denote d-line and F-line light. "ΔM" and "ΔS" respectively denote a meridional image plane and a sagittal image plane. Lateral Chromatic aberration is represented with respect to F-line light.

In the lens cross sections of FIGS. 1 through 3, "L" denotes lens units, "EP" denotes an eye point, and "I" denotes an image display surface, which may also be considered as the object plane.

A plate that protects the image display surface and the lens can be provided between the image display surface and the lens unit or between the lens unit and the eye point. The eye point can be displaced along the optical axis within the range in which rays that have exited from the periphery of the image display surface passes through the pupil of the observer.

Numerical examples 1 through 3 are set forth below. In each of the numerical examples 1 through 3, "Ri" (where i=1, 2, 3 . . . ) denotes a radius of curvature of an i-th optical surface (the i-th lens surface) from the image display surface side towards the observer sided, "Di" denotes the distance (space (the lens thickness or the air space)) between the i-th surface and the (i+1)-th surface, "Ni" and "υi" respectively denote a refractive index and an Abbe number of the material of the i-th lens.

In addition, each of "k", "B", "C", "D", "E", "A'", "B'", "C'", "D'", and "E'" denote an aspheric coefficient. The aspheric shape is expressed as $$X = ((1/R)h^2)/\left[1 + \{1 - (1+k)(h/R)^2\}^{1/2}\right] + Bh^4 + Ch^6 + Dh^8 + Eh^{10} + A'h^3 + B'h^5 + C'h^7 + D'h^9 + E'h^{11}$$

where "X" denotes a displacement from a surface vertex along the optical axis in a position at a height "h" from the optical axis, and "R" denotes a paraxial radius of curvature. The aspheric shape has a positive value in the direction of travel of light. The scientific notation "e-Z" for each aspheric coefficient is equivalent to the exponential notation "$1 \times 10^{-Z}$". In each numerical example, an asterisk "*", which is assigned to the right side of the surface number, denotes an aspheric surface. Furthermore, in each numerical example, "IS" denotes the image display surface and "EP" denotes the eye point. The relationship between each condition described above and each numerical example is set forth in Table 1.

NUMERICAL EXAMPLE 1

| Unit: mm | | | | |
|---|---|---|---|---|
| Surface Data | | | | |
| Surface No. | r | d | nd | vd |
| 1 | IS | Variable | | |
| 2* | 17.728 | 4.90 | 1.49171 | 57.4 |
| 3 | 3586.809 | 6.00 | | |
| 4 | 146.194 | 1.30 | 1.80518 | 25.4 |
| 5 | 30.001 | 2.00 | | |
| 6 | 60.678 | 5.35 | 1.69680 | 55.5 |
| 7 | −24.840 | Variable | | |
| 8 | EP | | | |

| Aspheric Coefficients | |
|---|---|
| r2 | K = −3.56359e+000 |

| Various Data | | | |
|---|---|---|---|
| Diopter | −5.5 | 0.0 | 2.0 |
| Focal Length | 26.27 | 26.27 | 26.27 |
| d1 | 12.61 | 16.58 | 17.96 |
| d7 | 24.84 | 20.87 | 19.50 |

NUMERICAL EXAMPLE 2

| Unit: mm | | | | |
|---|---|---|---|---|
| Surface Data | | | | |
| Surface No. | r | d | nd | vd |
| 1 | IS | Variable | | |
| 2* | 12.340 | 7.20 | 1.49171 | 57.4 |
| 3 | 101.106 | 3.50 | | |
| 4 | 33.240 | 1.30 | 1.84666 | 23.8 |
| 5 | 16.376 | 2.60 | | |
| 6 | 23.420 | 7.70 | 1.49171 | 57.4 |
| 7* | −23.295 | Variable | | |
| 8 | EP | | | |

| Aspheric Coefficients | | |
|---|---|---|
| r2 | K = −1.74842e+000 | B = 1.34893e−005 |
| | C = 5.02489e−008 | D = 8.30892e−011 |
| r7 | K = 2.30404e+000 | B = 5.59243e−005 |
| | C = −2.30758e−007 | D = 2.88047e−009 |

| Various Data | | | |
|---|---|---|---|
| Diopter | −5.5 | 0.0 | 2.0 |
| Focal Length | 24.16 | 24.16 | 24.16 |
| d1 | 12.19 | 15.60 | 16.75 |
| d7 | 20.40 | 17.00 | 15.85 |

NUMERICAL EXAMPLE 3

| Unit: mm | | | | |
|---|---|---|---|---|
| Surface Data | | | | |
| Surface No. | r | d | nd | vd |
| 1 | IS | Variable | | |
| 2* | 12.812 | 12.00 | 1.49171 | 57.4 |
| 3* | −125.406 | 2.40 | | |
| 4 | 43.013 | 1.50 | 1.84666 | 23.8 |
| 5 | 16.582 | 1.60 | | |
| 6* | 15.879 | 7.20 | 1.49171 | 57.4 |
| 7* | −35.745 | Variable | | |
| 8 | EP | | | |

| Aspheric Coefficients | | |
|---|---|---|
| r2 | K = −1.79988e+000 | B = 3.06656e−005 |
| | C = −2.25923e−008 | D = 1.70587e−010 |
| r3 | K = 5.54314e+000 | B = 1.43005e−005 |
| | C = −1.27790e−008 | D = −4.39255e−011 |
| r6 | K = −1.54392e−001 | B = −6.19599e−005 |
| | C = 4.05530e−007 | D = −4.48876e−010 |
| r7 | K = 1.36022e+000 | B = 1.11235e−006 |
| | C = 1.21699e−007 | D = 2.65862e−009 |

| Various Data | | | |
|---|---|---|---|
| Diopter | −6.0 | 0.0 | 2.5 |
| Focal Length | 22.31 | 22.31 | 22.31 |
| d1 | 11.89 | 15.13 | 16.35 |
| d7 | 20.24 | 17.00 | 15.78 |

TABLE 1

| | Numerical Example | | |
|---|---|---|---|
| Condition | 1 | 2 | 3 |
| (1) | 0.50 | 0.55 | 0.59 |
| (2) | 26.27 | 24.16 | 22.31 |
| (3) | 3.00 | 1.35 | 1.50 |
| (4) | 0.48 | 0.51 | 0.52 |

With the above-described configuration, each exemplary embodiment of the present invention can implement a viewfinder eyepiece lens of a size as small as possible, whose image display surface is as small as possible, and capable of allowing an observer to observe a high-quality large-size image.

Now, an exemplary embodiment of a video camera (image pickup apparatus) that uses the eyepiece lens according to an exemplary embodiment of the present invention will be described in detail below with reference to FIG. 7.

Figure 7:
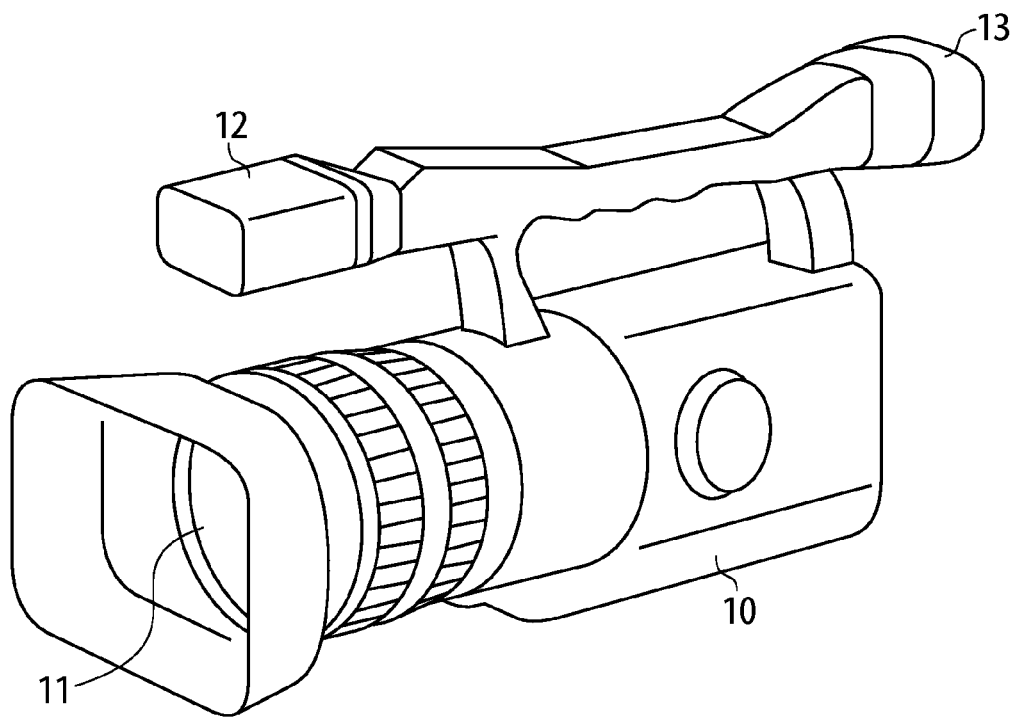
FIG. 7 illustrates an exemplary configuration of an eyepiece lens according to an exemplary embodiment of the present invention when applied to a video camera.

Referring to FIG. 7, the video camera includes a camera body (image pickup apparatus body) 10 and a photographic optical system (imaging optical system) 11, which forms an object image on an image sensor (not illustrated). The video camera further includes a sound collection microphone 12. The video camera further includes an electronic viewfinder 13 for allowing an observer to observe an object image displayed on an image display element (not illustrated) via the eyepiece lens according to an exemplary embodiment of the present invention. The image display element is constituted, for example, by an LCD panel. An image formed by the photographic optical system 11 is displayed on the image display element and an observer can observe such an image through the viewfinder 13 by placing the observer's eye at a predetermined position therein.

By applying the eyepiece lens according to an exemplary embodiment of the present invention to an optical apparatus, such as a video camera, the present invention can appropriately allow the observer to observe an object image.

Unless otherwise particularly noted, the values used in the above-described exemplary embodiment of the present invention are indicated in units of millimeter.

With the above-described configuration, an exemplary embodiment of the present invention can provide a viewfinder eyepiece lens of relatively small size, where the image display surface can be made relatively smaller than in conventional devices, and the observer can observe a high-quality large-sized image.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-087086 filed Apr. 5, 2010, which is hereby incorporated by reference herein in its entirety.

What is claimed is:

1. An eyepiece lens comprising, arranged along an optical axis thereof and in order from an image display surface side towards an observer side:
    a positive first lens in which a surface on the image display surface side has a refractive power stronger than the refractive power of a surface on the observer side;
    a negative second lens having a meniscus shape, a surface of the negative second lens on the image display surface side having a convex shape; and
    a positive third lens, both surfaces of which have a convex shape,
    wherein, during diopter adjustment, the first through the third lenses move along the optical axis, and
    wherein a focal length (f) of the entire eyepiece lens and a diagonal length (H) of the image display surface satisfy the following conditions:

$0.45 < H/f < 0.70$ $21.0 \text{ (mm)} < f < 29.0 \text{ (mm)}$.

2. The eyepiece lens according to claim 1, wherein at least one surface of the first lens is an aspheric surface, and
    wherein a distance between the first lens and the second lens (d12) and a distance between the second lens and the third lens (d23) satisfy the following condition:

$1.0 < d12/d23 < 3.3$.

3. The eyepiece lens according to claim 1, wherein the diagonal length (H) of the image display surface and an air-equivalent distance (L) from the image display surface to the first lens when a diopter is 0 diopter satisfy the following condition:

$0.40 < 0.6 \times H/L < 0.70$.

4. An electronic viewfinder comprising the eyepiece lens according to claim 1.

5. An image pickup apparatus comprising:
    an image sensor;
    a photographic optical system configured to form an object image on the image sensor;
    an image display element configured to display the object image photographed by the image sensor;
    an eyepiece lens configured to allow an observer to observe an image displayed by the image display element,
    wherein the eyepiece lens includes, aligned along an optical axis thereof and in order from an image display surface side towards the observer side:
        a positive first lens in which a surface on the image display surface side has a refractive power stronger than a refractive power of a surface on the observer side;
        a negative second lens having a meniscus shape, a surface of the negative second lens on the image display surface side having a convex shape; and
        a positive third lens, both surfaces of which have a convex shape,
    wherein, during diopter adjustment, the first through the third lenses move along the optical axis, and
    wherein a focal length (f) of the entire eyepiece lens and a diagonal length (H) of the image display surface satisfy the following conditions:

$0.45 < H/f < 0.70$, and $21.0 \text{ (mm)} < f < 29.0 \text{ (mm)}$.

* * * * *